United States Patent [19]

Gunagan et al.

[11] Patent Number: 5,354,494

[45] Date of Patent: Oct. 11, 1994

[54] REACTIVE SILANE COMPOSITION AND PROCESS FOR ENHANCED DRAINAGE OF RESIDUAL AQUEOUS RINSE ON THE EXTERNAL SURFACES OF PLASTIC PARTS

[75] Inventors: Barry P. Gunagan, Hatboro; Jeffrey I. Melzer, Lansdale; Edward A. Rodzewich, Flourtown, all of Pa.; Robert A. Iezzi, Vincentown, N.J.

[73] Assignee: Betz Laboratories, Inc., Trevose, Pa.

[21] Appl. No.: 823,217

[22] Filed: Jan. 21, 1992

[51] Int. Cl.$^5$ .................... C11D 3/02; C11D 3/43; C09D 183/16
[52] U.S. Cl. .................... 252/174.15; 252/DIG. 19; 134/4; 106/2; 106/287.11; 106/287.12
[58] Field of Search .................... 252/174.15, DIG. 19; 134/4; 106/2, 287.11, 287.12

[56] References Cited

U.S. PATENT DOCUMENTS

| Re. 33,759 | 12/1991 | De Pasquale et al. | 106/2 |
|---|---|---|---|
| 4,273,584 | 6/1981 | D'Angelo et al. | 106/3 |
| 4,416,793 | 11/1983 | Barrat et al. | 252/117 |
| 4,446,035 | 5/1984 | Barrat et al. | 252/8 |
| 4,448,699 | 5/1984 | Barratt et al. | 252/8.75 |
| 4,560,493 | 12/1985 | Scharf et al. | 252/174.16 |
| 4,859,359 | 8/1989 | De Matteo et al. | 252/174.15 |
| 5,209,775 | 5/1993 | Bank et al. | 106/2 |

FOREIGN PATENT DOCUMENTS 0075987 4/1983 European Pat. Off. .
63-248897 10/1988 Japan .

*Primary Examiner*—Paul Lieberman
*Assistant Examiner*—Kery Fries
*Attorney, Agent, or Firm*—Alexander D. Ricci; Philip H. Von Neida

[57] ABSTRACT

Processes for enhancing the drainage of residual aqueous rinse from the external surfaces of plastic parts, such as auto fascia, are disclosed. The processes employ an aqueous solution of an amine functional silane compound, which when applied to the surfaces of plastic parts will not rinse off during subsequent rinse stages and will remain on the plastic parts.

6 Claims, No Drawings

REACTIVE SILANE COMPOSITION AND PROCESS FOR ENHANCED DRAINAGE OF RESIDUAL AQUEOUS RINSE ON THE EXTERNAL SURFACES OF PLASTIC PARTS

FIELD OF THE INVENTION

The present invention relates to compositions and processes for rinsing plastic parts. Aqueous solutions of amine functional silane compounds are effective at enhancing the drainage of residual rinse water from the surfaces of the plastic parts.

BACKGROUND OF THE INVENTION

In the automotive industry, the formed plastic parts (fascia) used are often painted. This is to provide a smooth, oftentimes metal-like finish. The paint covers molding and other substrate imperfections. Decorative effects such as mirror finishes, texturing and color match of differently processed parts are also achieved by painting.

Examples of plastics that are paintable and used in the automotive industry include polycarbonate/polybutylene terephthalate, polyphenyleneoxide/nylon 66, polyphenyleneoxide/polybutylene terephthalate, polyetherpolyester copolymer/polybutylene terephthalate, polycarbonate (both unfilled and glass filled), polyphenyleneoxide (both unfilled and filled) and a resin/glass material.

Most plastics need to be cleaned before painting them. The most common contaminants that must be removed before painting are mold release agents, shop soil, material handling soil, machining soils, fingerprints and plastic sanding dust. These contaminants are removed by chemical means such as detergents.

The process of cleaning plastic parts generally entails a wash stage, a rinse stage and a final rinse stage with deionized water. The plastic part can be either spray washed or immersed in the detergent. The most common processes are either an acidic detergent wash stage followed by multiple rinse stages, or an alkaline detergent stage, followed by a rinse stage, an acidic detergent wash stage, and multiple rinse stages. One process, for example, employs in stage I an alkaline wash, followed by a tap water rinse in stage 2. Stage 3 is an acidic wash with a tap water rinse in stage 4. Stages 5 and 6 can then be deionized water rinses.

When the plastic part is to be painted, the cleaning operation is performed in a production line with the freshly cleaned part sequentially conveyed into the paint booth. Problems can occur however, when the freshly cleaned part is not fully dry. This can lead to "spotting" when painted and will result in an imperfect paint job. This will require stripping of the part and/or an additional painting procedure.

Further, when a bead of water dries on the plastic surface, ionic salts such as Cl, Ca, Mg and K will remain on the surface of the plastic. After the plastic has been painted, there will be a visual defect there. Exposure to humidity which can cause increased water sensitivity can lead to blistering of the paint. Adhesion problems could also possibly result.

Removing the aqueous rinse water from the surface of the plastic requires a drainage enhancing solution which will effectively aid in drying the plastic part to be painted. The present inventors have discovered an aqueous solution which will aid in reducing spotting on the external surface of plastic parts. More surprisingly, the present inventors have discovered a drainage enhancing solution that will not be rinsed off the surface of the plastic parts by subsequent rinses.

SUMMARY OF THE INVENTION

The present invention provides for compositions and processes for enhancing the drainage of residual aqueous rinse from the external surfaces of plastic parts comprising an amine functional silane compound.

More preferably, the present invention provides for a composition and process for enhancing the drainage of residual aqueous rinse from the external surfaces of plastic parts comprising an aqueous solution of aminopropyl silane. The improvement in the processes of the present invention is the ability of the drainage enhancing solution to remain on the surface of the plastic parts during subsequent rinse stages.

The present invention effectively reduces the amount of residual water on the external surfaces of plastic parts prior to their painting. Any water left on the external surfaces can lead to spots and imperfections in the final paint finish. This invention is particularly effective for aiding the drainage of an aqueous rinse from the external surfaces of virgin and rework plastic used in the automotive industry.

DESCRIPTION OF THE RELATED ART

U.S. Pat. No. 4,448,699, Barrat et al., May 1984, discloses a laundry additive product for inhibiting the corrosion of enameled surfaces. This laundry additive comprises an aminosilane.

U.S. Pat. No. 4,500,493, Scharf et al., December 1985, discloses a composition and method for reducing the liquid residue remaining on a metal surface consisting of octane-1-phosphonic acid or water soluble salt thereof.

DETAILED DESCRIPTION OF THE INVENTION

The present invention provides for compositions and processes for enhancing the drainage of residual aqueous rinse from the external surfaces of plastic parts comprising contacting an effective amount for the purpose of an aqueous solution of an amine functional silane compound, wherein said aqueous solution remains on the surfaces of said plastic parts during subsequent rinse stages.

The amine functional silane compounds are preferably amine functional such as aminopropyl silanes. The preferred aminopropyl silane compound is aminopropyltrimethoxy silane. This compound is available as an aqueous solution from Huls and is designated Hydrasil ® 2627.

Prior rinse processes generally reduced the surface tension of the rinse water to aid the water in sheeting. However, this was a once-through treatment as the rinse aid, too, would be removed from the plastic and would not be available for additional rinses without further addition.

The improvement in the present invention is that the silane compounds react with the plastic surface and are not removed when rinsed. This allows the rinse aid to be applied in the earliest rinse stage and will remain effective throughout subsequent rinses. This eliminates the necessity of applying the rinse aid prior to each rinse stage.

The advantages of having the silane react with the plastic are fourfold. The drainage enhancing agent can be added at any stage along the processing line, before or after the acid or alkaline detergent wash. There will be a reduction in carryover or drag-in of ionic salts as the plastic part moves through the process. Water sensitivity of painted parts will be lessened as fewer and fewer ionic salts remain on the plastic. If the rinse aid is added early in the process, there is potential for reduced rinse water use in later stages. Contamination of later rinse water stages will be reduced, thereby lessening the amount of makeup water needed.

The amine functional silane compound is preferably added to the plastic in an aqueous solution, preferably in deionized water. Other compatible solvents may also be utilized. The amine functional silane may be added to the aqueous medium in a concentration of about 0.01% to about 50% by weight. The preferred concentration is about 0.04%.

The pH of the aqueous solution of amine functional silane can be adjusted to improve effectiveness as a rinse aid enhancer. The processes are most effective at pH's below 6.5 and above 7.5–8.0. Fluozirconic acid has been used to lower the pH. The present inventors anticipate that citric, acetic, phosphoric, nitric, and other fluoacids would be effective at lowering the pH of the rinse aid.

A microbiological growth inhibitor such as methylene bisthiocyanate or fluoride compound may also be added in small quantities to inhibit the growth of microorganisms during storage of the blended product.

The process of applying the aqueous solution of the amine functional silane may be either by spraying the plastic part or by immersing the plastic part in the aqueous solution. However, sufficient contact time must be allowed for the amine functional silane-plastic reaction to occur. This contact time can be as long as 30 seconds.

The amine functional silane aqueous solutions may also be employed along with other wetting agents. They may improve the wettability and reactivity of the silane solutions. The present inventors anticipate that any surfactant that lowers the surface tension of the water on the plastic will prove useful. Modified oxyethylated straight chain alcohols are relevant examples of these surfactants.

The invention will now be further described with reference to a number of specific examples which are to be regarded solely as illustrative, and not as restricting the scope of the invention.

EXAMPLES

Automotive grade plastic parts (trade name, Xenoy, available from General Electric) were processed according to the following sequence:

| Stage | Treatment Step |
|---|---|
| 1 | 3% Betz Kleen ® 132 alkaline wash, 1 minute spray at 140° F. |
| 2 | Tap water rinse, 45 seconds |
| 3 | 2% Permatreat ® 302 acidic wash, 30 second spray at 135° F. |
| 4 | Tap water rinse, 30 seconds |
| 5 | Deionized water rinse, 30 seconds |

Betz Kleen ® 132 and Permatreat ® 302 are both available from Betz Laboratories, Inc., Trevose, Pennsylvania.

To evaluate the efficacy of the inventive composition as a rinse enhancer, dilute deionized water solutions of Hydrasil ® 2627 were used in place of the deionized water spray rinse in Stage 5.

Evaluations were based on the weight of water retained on a 3"×4" plastic part, as well as, visual observation of surface wetting. These results are reported in Table I.

TABLE I

| Rinse Agent | Water Retention (gms) | % Water Break free after Stage 5 |
|---|---|---|
| Deionized water | 1.0460 | 0 |
| Aminopropyl Silane[1] 0.1% Solution | 0.5275 | 100 |
| Aminopropyl Silane[1] 0.2% Solution | 0.3661 | 100 |

[1]Hydrasil ® 2627

Surface wetting is reported as percent water break free. A 100% water break free is wet with a continuous film of water. A 0% water break free surface has beads of water on its surface. Lower water retention weights are also indicative of effective drainage enhancement. The results reported in Table I indicate that the inventive treatment agent is an effective rinse aid.

To demonstrate that the drainage enhancing agent remains on the surface of the plastic, a six stage treatment process was used:

| Stage | Treatment Step |
|---|---|
| 1 | 3% Betz Kleen ® 132 alkaline wash 1 minute spray at 140° F. |
| 2 | Tap water rinse, 45 seconds |
| 3 | 2% Permatreat ® 302 acidic wash, 30 second spray at 135° F. |
| 4 | Tap water rinse, 30 seconds |
| 5 | Deionized water rinse, 30 seconds |
| 6 | Virgin Deionized water rinse, 10 seconds |

Betz Kleen ® 132 and Permatreat ® 302 are both available from Betz Laboratories, Inc., Trevose, Pa.

Dilute deionized solutions of Hydrasil ® 627 were used in place of the deionized water stage rinse in Stage 5.

Evaluations were based on visual observation of surface wetting after the virgin deionized rinse (Stage 6). These results are reported in Table II.

TABLE II

| Rinse Agent | % Water Break Free After Stage 6 |
|---|---|
| Deionized water | 0 |
| Aminopropyl Silane[1] 0.1% Solution | 100 |
| Aminopropyl Silane[1] 0.2% Solution | 100 |

[1]Hydrasil ® 2627

These results further indicate that even after an additional rinse, the amine functional silane compounds remained on the surface of the plastic and provided effective rinse aid enhancement.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A process for enhancing the drainage of residual aqueous rinse water from the external surfaces of plastic parts comprising contacting an aqueous solution from about 0.01% to about 50% by weight to said plastic parts of an amine functional silane compound wherein the amino-functional silane reacts with and remains attached to the surface of the plastic thereafter subjecting the plastic parts to at least one subsequent rinse stage, wherein said aqueous solution remains bound to the surfaces as a continuous film of water of said plastic parts during subsequent rinse stages.

2. The process as claimed in claim 1 wherein said amine functional silane compound is an aminopropyl silane compound.

3. The process as claimed in claim 2 wherein said aminopropyl silane compound is aminopropyltrimethoxy silane.

4. The process as claimed in claim 1 wherein the concentration of said amine functional silanes in said aqueous solution is about 0.04% by weight.

5. The process as claimed in claim 1 wherein said contacting is by spraying of said aqueous solution.

6. The process as claimed in claim 1 wherein said contacting is by immersion in said aqueous solution.

* * * * *